(12) United States Patent
Devarasetty et al.

(10) Patent No.: US 8,913,965 B2
(45) Date of Patent: Dec. 16, 2014

(54) METHODS, SYSTEMS, AND COMPUTER READABLE MEDIA FOR DETECTING ANTENNA PORT MISCONFIGURATIONS

(71) Applicant: Ixia, Calabasas, CA (US)

(72) Inventors: Prasada Rao Devarasetty, Cary, NC (US); Kalyan Sundhar, Cary, NC (US); Roger Alan Slyk, Raleigh, NC (US)

(73) Assignee: Ixia, Calabasas, CA (US)

(*) Notice: Subject to any disclaimer, the term of this patent is extended or adjusted under 35 U.S.C. 154(b) by 204 days.

(21) Appl. No.: 13/680,964

(22) Filed: Nov. 19, 2012

(65) Prior Publication Data

US 2014/0141728 A1     May 22, 2014

(51) Int. Cl.
*H04B 17/00*      (2006.01)
*H04W 24/02*    (2009.01)

(52) U.S. Cl.
CPC .................................. *H04W 24/02* (2013.01)
USPC ................... 455/67.11; 455/67.14; 455/562.1

(58) Field of Classification Search
USPC ............. 455/423, 67.11, 67.12, 67.14, 115.1, 455/115.2, 226.1, 575.7, 193.1, 562.1
See application file for complete search history.

(56) References Cited

U.S. PATENT DOCUMENTS

| | | | |
|---|---|---|---|
| 7,792,502 B2* | 9/2010 | Baker ........................ | 455/115.2 |
| 8,125,399 B2* | 2/2012 | McKinzie et al. ........... | 343/746 |
| 8,269,683 B2* | 9/2012 | McKinzie et al. ........... | 343/745 |
| 8,391,810 B2* | 3/2013 | Baker ........................ | 455/115.2 |
| 2013/0303145 A1* | 11/2013 | Harrang et al. .............. | 455/418 |
| 2014/0018012 A1* | 1/2014 | Zhang et al. ................ | 455/73 |
| 2014/0085057 A1* | 3/2014 | Horst et al. ................ | 340/10.51 |
| 2014/0087668 A1* | 3/2014 | Mow et al. ................. | 455/67.14 |

OTHER PUBLICATIONS

"3rd Generation Partnership Project; Technical Specification Group Radio Access Network; Evolved Universal Terrestrial Radio Access (E-UTRA); Physical layer; Measurements (Release 11)," 3GPP TS 36.214, V11.0.0 (Sep. 2012).

"3rd Generation Partnership Project; Technical Specification Group Radio Access Network; Evolved Universal Terrestrial Radio Access (E-UTRA); Physical layer procedures (Release 11)," 3GPP TS 36.213, v11.0.0 (Sep. 2012).

"3rd Generation Partnership Project; Technical Specification Group Radio Access Network; Evolved Universal Terrestrial Radio Access (E-UTRA); Multiplexing and channel coding (Release 11)," 3GPP TS 36.212, V11.0.0 (Sep. 2012).

"3rd Generation Partnership Project; Technical Specification Group Radio Access Network; Evolved Universal Terrestrial Radio Access (E-UTRA); Physical Channels and Modulation (Release 11)," 3GPP TS 36.211, v11.0.0 (Sep. 2012).

"Error Vector Magnitude," Wikipedia, pp. 1-3 (Printed from the Internet Apr. 23, 2013).

* cited by examiner

*Primary Examiner* — Sonny Trinh
(74) *Attorney, Agent, or Firm* — Jenkins, Wilson, Taylor & Hunt, P.A.

(57) ABSTRACT

Methods, systems, and computer readable media for detecting antenna port misconfigurations are disclosed. According to one method, the method includes storing one or more reference signal maps for identifying reference signals in downlink data in memory. The method further includes receiving downlink data that appears to be associated with a first antenna port of a device under test (DUT). The method also includes identifying, using the one or more reference signal maps, a first reference signal in the downlink data, wherein the first reference signal appears to be associated with the first antenna port. The method further includes determining, using a first computed error vector magnitude associated with the first reference signal, whether the first antenna port is misconfigured.

22 Claims, 7 Drawing Sheets

METHODS, SYSTEMS, AND COMPUTER READABLE MEDIA FOR DETECTING ANTENNA PORT MISCONFIGURATIONS

TECHNICAL FIELD

The subject matter described herein relates to testing communications networks. More specifically, the subject matter relates to methods, systems, and computer readable media for detecting antenna port misconfigurations.

BACKGROUND

Long term evolution (LTE) and other radio communications technologies can require significant infrastructure and configuration. Generally, network operators test various aspects of their network equipment to ensure reliable and efficient operation. Network operators typically simulate various conditions before equipment is deployed in a live network to decrease avoidable delays and/or other problems.

Various technical specifications, such as the 3rd Generation Partnership Project (3GPP) Technical Specifications 36.211, 36.212, 36.213, and 36.214, hereinafter respectively referred to as "TS 36.211", "TS 36.212", "TS 36.213", and "TS 36.214", define aspects of LTE communications.

Generally, data from the network to a user device is referred to as downlink data and data from the user device to the network is referred to as uplink data. For example, user equipment (UE), such as a cellular mobile phone, may communicate with an enhanced or evolved Node B (eNode B) via the cellular radio transmission link. Data that is sent from the eNode B to the UE is downlink data, and data that is sent from the UE to the eNode B is uplink data.

Uplink and downlink LTE data is usually transmitted using one or more multiplexing and/or modulation schemes. For example, in some LTE networks, downlink data is transmitted using an orthogonal frequency-division multiplexing (OFDM) and uplink data is transmitted using single carrier frequency-division multiple access (SC-FDMA). Such schemes may allow multiple streams of data to be sent simultaneously (e.g., at different frequencies). While such schemes may allow data to be communicated at high-speed, significant processing is required to encode and decode the data. For example, an eNode B may perform channel coding, multiplexing, and interleaving of data and control streams, which are then sent to the UE over the air (RF) interface. After pre-processing the received signal from the eNode B, the UE may perform channel delineation for downlink physical channels and/or other baseband processing. After separating LTE data from various physical layer channels, the LTE data may be further processed.

In some testing environments, an eNode B may be connected to a testing platform via physical cables. For example, radio frequency (RF) cables may connect antenna ports of the eNode B to antenna ports on the testing platform. If the physical cables are not connected properly between the testing platform and the eNode B, communications between the testing platform and the eNode B may be corrupted or otherwise hindered. Moreover, test operators may have no knowledge of any connection issue and may waste valuable resources, including time, diagnosing connection-related communication issues. While test operators can manually check cable connections for possible misconfigurations, the number of cables and permutations of possible connections can complicate this process. Further, in some setups, the eNode B and the testing platform may be geographically separated, e.g., located in different rooms or locations, creating additional confusion when attempting to manually check physical connections.

Accordingly, in light of these difficulties, a need exists for improved methods, systems, and computer readable media for detecting antenna port misconfigurations.

SUMMARY

Methods, systems, and computer readable media for detecting antenna port misconfigurations are disclosed. According to one method, the method includes generating and storing one or more reference signal maps for identifying reference signals in downlink data in memory. The method further includes receiving downlink data that appears to be associated with a first antenna port of a device under test (DUT). The method also includes identifying, using the one or more reference signal maps, a first reference signal in the downlink data, wherein the first reference signal appears to be associated with the first antenna port. The method further includes determining, using a first computed error vector magnitude associated with the first reference signal, whether the first antenna port is misconfigured.

A system for detecting antenna port misconfigurations is also disclosed. The system includes a memory is configured to generate and store one or more reference signal maps for identifying reference signals in downlink data in memory. The system also includes a connection analyzer configured to receive downlink data that appears to be associated with a first antenna port of a device under test (DUT), to identify, using the one or more reference signal maps, a first reference signal in the downlink data, wherein the first reference signal appears to be associated with the first antenna port, to determine, using a first computed error vector magnitude associated with the first reference signal, whether the first antenna port is misconfigured.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
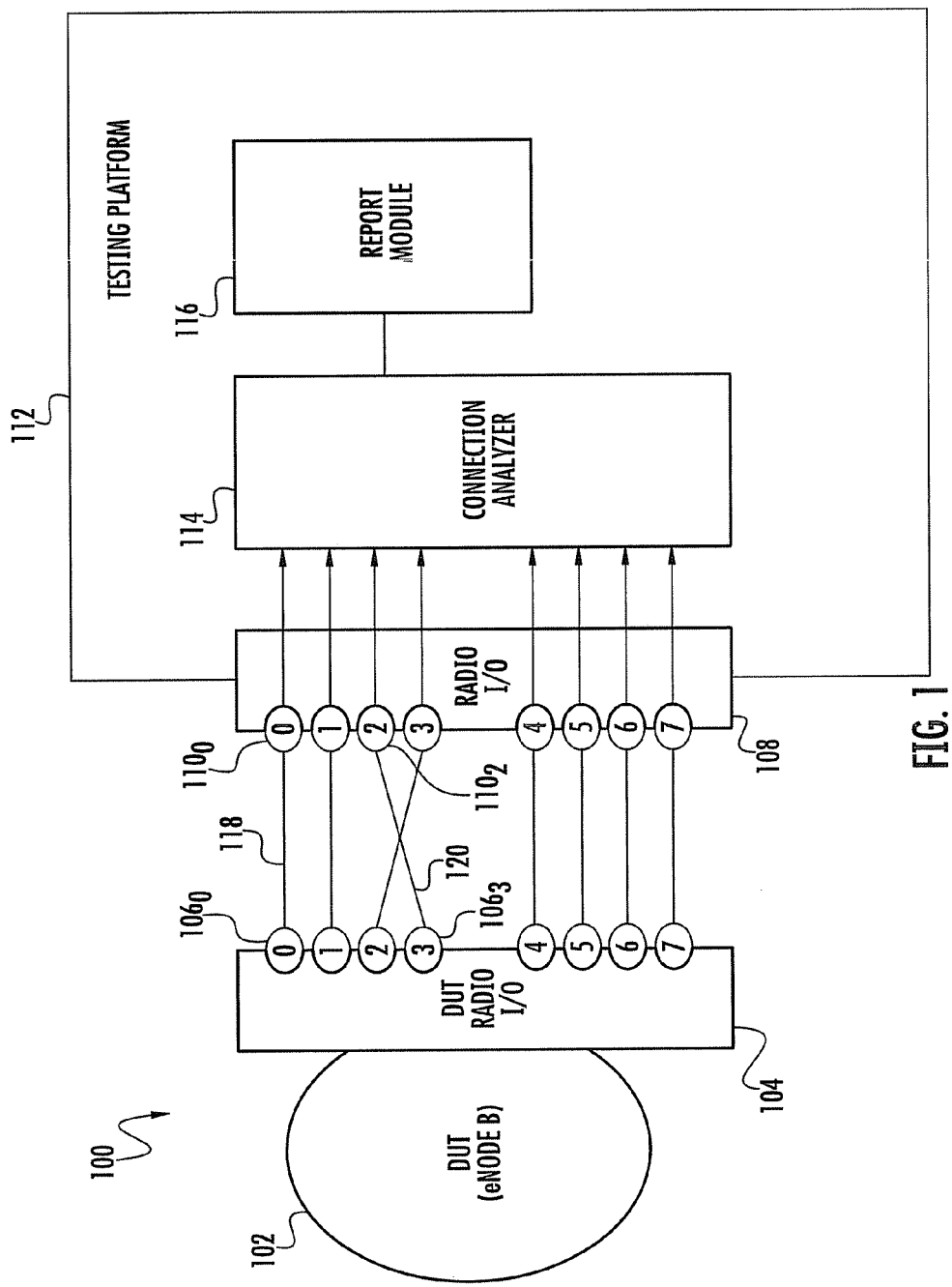
FIG. 1 is a diagram illustrating an exemplary device for detecting antenna port misconfigurations according to an embodiment of the subject matter described herein.

The subject matter described herein discloses methods, systems, and computer readable media for detecting antenna port misconfigurations. When testing LTE networks and/or other wireless communications network, it may be desirable to test the response of the network and other equipment under non-trivial load conditions. For example, it may be desirable to test LTE communications by simulating multiple UEs simultaneously communicating with the eNode B.

In LTE and LTE advanced systems, LTE data is usually transmitted between an eNode B and UEs via radio frames. Each radio frame generally has parts, such as subframes, that can contain large amounts of data. For example, in a 20 MHz transmission environment, a subframe may include a hundred resource blocks (RBs). RBs may generally be thought of as two-dimensional arrays (e.g., time-frequency grids) of data portions called resource elements (REs). Each RB may contain various configurations or arrangements of REs. That is, each RB may have REs of different physical channels and signals. Moreover, an RB configuration may be different among RBs in a subframe, and RB configurations may also vary among subframes, e.g., based on traffic or network conditions.

RBs may also include reference signals (also referred to herein as pilot signals). Reference symbols may be inserted in an RB for channel estimation. Generally, nothing may be transmitted on the other antennas at the same time-frequency location of reference signals. The number and location of reference signals may depend on the number of antenna ports and the type of cyclic prefix used. Each antenna port may be associated with a unique reference signal or reference signal sequence, e.g., a sequence of bits that is uniquely associated with a single antenna port. While the number and location of reference signals may vary depending on antenna ports and the type of cyclic prefix used, TS 36.211 discloses the number and location of downlink reference signals in an RB for various numbers of antenna ports. For example, FIG. 6.10.1.2-1 of TS 36.211 discloses channel resource maps, also referred to herein as reference signal maps, for indicating locations of reference signals in an RB.

Advantageously, aspects of the subject matter described herein can be used to efficiently detect antenna port misconfigurations by analyzing, using one or more reference signal maps and/or computed error vector magnitudes (EVMs), reference signals contained in downlink data. For example, a first RF cable may transmit downlink data associated with a first antenna port (R0) of an eNode B to a testing platform and a second RF cable may transmit downlink data associated with a second antenna port (R1) of the eNode B to the testing platform. During testing, downlink data containing reference signals may be received over both cables. Using a reference signal map and/or a known reference signal sequence for antenna port R0, a reference signal appearing to be associated with antenna port R0 may be identified in the downlink data associated with the first RF cable. If a computed error vector magnitude associated with the reference signal is outside (e.g., above or below) a predetermined threshold, an antenna port misconfiguration may be detected. If a misconfiguration is detected, other reference signals appearing to be associated with other antenna ports may be analyzed to determine if one of the other reference signals is associated with antenna port R0. For example, using the reference signal map and/or a known reference signal sequence for antenna port R1, a second reference signal in the downlink data appearing to be associated with antenna port R1 may be analyzed. If a computed error vector magnitude associated with the second reference signal is within (e.g., below) a predetermined threshold, the second reference signal may be determine to be associated with antenna port R0 and/or a cable swap may be suggested to correct antenna port configuration. In some embodiments, aspects of the subject matter described herein may be used to report or provide antenna port configuration analysis information, such as suggestions for fixing antenna port misconfigurations, to users or other modules.

FIG. 1 is a diagram illustrating an exemplary network 100 for detecting antenna port misconfigurations according to an embodiment of the subject matter described herein. Network 100 may include a device under test (DUT) 102, a testing platform 112, and radio input/output (I/O) modules or radio heads 104 and 108. DUT 102 may represent any suitable entity (e.g., a base transceiver station (BTS), node B, eNode B, a WiMAX base station etc.) for providing LTE or LTE advanced data via an air or wire interface. For example, DUT 102 may be an LTE mobile network entity having functionality similar to that of a radio network controller (RNC) and a base station (BS) in 2G networks or an RNC and a Node B in 3G mobile networks. In some embodiments, DUT 102 may communicate directly with LTE or LTE advanced UEs and is responsible for header compression, ciphering, reliable delivery of packets, admission control, and radio resource management. DUT 102 may also communicate with various other modules and/or nodes, e.g., radio head 104 and/or testing platform 112.

Radio head 104 may represent any suitable entity for controlling and/or performing radio I/O functions; e.g., sending communications from DUT 102 or receiving communications destined for DUT 102. In some embodiments, radio head 104 may be distinct from or integrated with DUT 102. Radio head 104 may perform analog-to-digital and/or digital-to-analog conversion. Radio head 104 may also include operation and management processing capabilities and a standardized optical interface to connect to one or more components. Radio head 104 may communicate using various communications protocols. For example, radio head 104 may be connected to DUT 102 via one or more fiber optic cable using a common public radio interface (CPRI) protocol or may be connected via another interface or using other protocols. Data transmitted over a CPRI link may consist of digitized samples of the analog baseband signal, plus a low bandwidth control channel. Data carried over the CPRI link may be a continuous stream of numbers, representing the digitized samples of the baseband waveform. A CPRI connection may support one or more component carriers and each carrier may support one or more antennas, where each antenna may represent in SISO (single input and single output) or MIMO (multiple-input and multiple-output configurations.

In some embodiments, radio head 104 may include external ports 106. Each external port 106 may be a suitable entity (e.g., a RF cable male/female connector, a BNC connector, a Type N male/female connector, etc.) for accepting a connector or connection and may receive or provide uplink or downlink data. For example, external port $106_1$ may provide downlink data associated with a first antenna port (R0) to other destinations, external port $106_2$ may provide downlink data associated with a second antenna port (R1) to other destinations, and so on and so forth. In another example, external port $106_1$ may receive uplink data from testing platform 112 or radio head 108. In some embodiments, the data provided via external ports 106 may be sent from DUT 102 to radio head 104 via a CPRI connection or other connection.

Radio head 108 may be associated with testing platform 112 and may include functionality similar to radio head 104. For example, radio head 108 represent any suitable entity for controlling and/or performing radio I/O functions; e.g., sending communications from testing platform 112 or receiving communications destined for testing platform 112. In some embodiments, radio head 108 may be distinct from or integrated with testing platform 112.

Radio head 108 may include external ports 110. External ports 110 may be similar to external ports 106. For example, external port $110_1$ may receive downlink data associated with a first antenna port (R0), external port $110_2$ may receive downlink data associated with a second antenna port (R1), and so on and so forth. In another example, external port $106_1$ may provide uplink data from testing platform 112 or radio head 108 to other destinations, such as radio head 104 or DUT 102.

In some embodiments, physical cables, such as RF cables, may be used to connect external ports 106 with external ports 110. For example, downlink data associated with antenna port R0 may be transmitted via RF cable 118 connecting external port $106_1$ and external port $110_1$. In this example, the downlink data may be stored, processed, and/or routed by radio head 108. In some embodiments, connections between external ports 106 and external ports 110 may include multiple cables connected to one or more intermediary devices (e.g., a switch panel node, a cable splitter, or a switch device).

Generally, when physical cables are connected to corresponding external ports (e.g., physical cable 118), the connection or antenna port configuration may be considered valid, correctly configured, or otherwise proper. Sometimes physical cables may be connected to non-corresponding external ports (e.g., physical cable 120). When physical cables are improperly connected, the connection or antenna port configuration may be considered invalid, misconfigured, or otherwise improper.

Testing platform 112 may be any suitable entity (e.g., a stand-alone node or distributed multi-node system) configured to perform one or more aspects associated with antenna port connection analysis. In some embodiments, testing platform 112 may be a stand-alone tool, a testing device, or software executing on a processor. In some embodiments, testing platform 112 may be a single node or may be distributed across multiple computing platforms or nodes.

In some embodiments, testing platform 112 may be integrated or co-located with a multiple UE simulator (multi-UE simulator). In such embodiments, the multi-UE simulator may be on a single node or may be distributed across multiple computing platforms or nodes. The multi-UE simulator may include functionality for simulating one or more LTE UEs, sending communications to DUT 102, receiving communications from DUT 102, and/or testing communications capabilities of DUT 102. The multi-UE simulator may also include functionality for storing received downlink data and providing the stored downlink data to one or more modules or components associated with testing platform 112.

Testing platform 112 may include various modules for performing one or more aspects described herein. Testing platform 112 may include a connection analyzer 114 for analyzing antenna port configurations and/or detecting antenna port misconfigurations and a report module 106 for indicating or reporting to a user or another module feedback associated with connection analysis. It will be appreciated that connection analyzer 114 and report module 106 may include various components. For example, connection analyzer 114 and report module 106 may include a field-programmable gateway array (FPGA), an application-specific integrated circuit (ASIC), and/or software executing on a processor.

Connection analyzer 114 may be any suitable entity (e.g., a module, an ASIC, a FPGA, or software executing on a processor) for analyzing downlink data associated with one or more ports. Connection analyzer 114 may receive downlink data from storage and/or components. In some embodiments, connection analyzer 114 may include functionality for communicating with radio head 108 via CPRI or other protocols. For example, a CPRI connection may provide downlink data from radio head 108 to connection analyzer 114. In another example, connection analyzer 114 may request and receive stored downlink data from memory associated with testing platform 112.

Connection analyzer 114 may include functionality for processing downlink data. For example, connection analyzer 114 may perform one or more aspects associated with downlink baseband processing for data transmitted from DUT 102. Connection analyzer 114 may perform data integrity operations (e.g., checking and removing CRC values), LTE channel data de-mapping or decoding, de-multiplexing operations, and/or other data processing.

Connection analyzer 114 may use known or ascertainable information to identify one reference signals associated with downlink data. For example, connection analyzer 114 may initially assume downlink data that arrives on external port $110_1$ is from antenna port R0 or external port $106_1$. In another example, connection analyzer 114 may initially assume downlink data that arrives on external port $110_3$ is from antenna port R2 or external port $106_3$.

Based on the assumed antenna port and a known reference signal sequence associated with the assumed antenna port, connection analyzer 114 may attempt to find the reference signal sequence in downlink data.

In some embodiments, reference signals associated with a particular antenna port have predefined or known locations within an RB. For example, connection analyzer 114 may attempt to identify a reference signal within downlink data by looking at locations that are assigned to or known to be associated with a particular antenna port of which the downlink data appears to be associated. For example, if downlink data appears to be associated with antenna port R1, connection analyzer 114 may attempt to find an appropriate reference signal within a downlink RB at a location where a reference signal for antenna port R1 is typically located.

In some embodiments, connection analyzer 114 may use a reference signal map (such as map 400 shown in FIG. 4) to identify the location of one or more reference signals. For example, connection analyzer 114 may receive downlink data that appears to be associated with antenna port R0. In this example, connection analyzer 114 may use a reference signal map to identify a location of a reference signal within an RB of the downlink data.

Connection analyzer 114 may compute an EVM associated with identified reference signal(s) in downlink data. An EVM may be used to determine the difference between an identified reference signal sequence and an expected reference signal sequence. If the computed EVM is within a predetermined EVM threshold, connection analyzer 114 may determine that the connection (e.g., RF cable 118 between external port $106_1$ and external port $110_1$) or an antenna port associated with the downlink data is correctly configured. If the computed EVM is in not within a predetermined EVM threshold, connection analyzer 114 may determine that the connection (e.g., RF cable 120 between external port $106_1$ and external port $110_1$) or an antenna port associated with the downlink data is misconfigured.

In some embodiments, connection analyzer 114 may detect an antenna port misconfiguration without computing an EVM. For example, if connection analyzer 114 determines that an expected reference signal sequence is not found in downlink data or that the location identified by a reference signal map did not include an expected reference signal sequence, connection analyzer 114 may determine a connection or antenna port to be misconfigured.

If an antenna port misconfiguration is detected, additional processing may be performed. For example, after detecting that an identified reference signal that appears to be associated with antenna port R0 does not match (e.g., as determined by a computed EVM) an expected reference signal associated with the antenna port R0, connection analyzer 114 may analyze other reference signals to determine if one of the other reference signals is associated with antenna port R0. By analyzing other reference signals in the downlink data, connection analyzer 114 may determine whether physical cables have been accidentally swapped and may inform a test operator or other entity via report module 116 or other reporting function.

In some embodiments, connection analyzer 114 may analyze other reference signals within a downlink RB to determine whether any of the other reference signals are associated with antenna port R0. For example, connection analyzer 114 may use a reference signal map to iterate through different reference signals that appear to be associated with different antenna ports. Connection analyzer 114 may analyze each of the different reference signals and determine whether a computed EVM is within a predetermined threshold. If connection analyzer 114 determines that one of the different reference signal sequences matches an expect reference signal sequence associated with antenna port R0, connection analyzer 114 may store analysis information and/or provide the information to a user, report module 116 or another module.

If connection analyzer 114 does not identify a match, connection analyzer 114 may store analysis report information and/or provide the information to a user, report module 116, or another module. For example, the analysis report information may include a list of valid antenna port configurations, a list of invalid antenna port configuration and/or suggestions for switching two cables to correct an antenna port configuration.

In some embodiments, after validating an antenna port configuration, detecting a possible solution to an antenna port misconfiguration, or failing to find a possible connection solution, connection analyzer 114 may analyze other downlink data for detecting misconfiguration associated with other antenna ports and/or related connections. After completing analysis of all antenna ports or detecting an antenna port misconfiguration with no possible solution, connection analyzer 114 may provide analysis report information to report module 116, a user, or another module.

Report module 116 may be any suitable entity (e.g., a module, an ASIC, a FPGA, or software executing on a processor) for indicating or reporting feedback associated with connection analysis. For example, report module 116 may receive feedback, such as analysis report information, from connection analyzer 114. Report module 116 may provide this information to a test operator or other user. For example, report module 116 may provide the information to a graphical user interface. The graphical user interface may present the information in various formats, such as using text and/or visual aids.

While connection analyzer 114 and report module 116 are described above as being part of testing platform 112, other configurations and/or arrangements may be implemented. For example, connection analyzer 114 and report module 116 may be part of radio head 108, radio head 104, or another node.

Moreover, while downlink data has been discussed above, aspects of the subject matter described herein may be used to analyze uplink data for determining antenna port misconfigurations. For example, to analyze uplink data, connection analyzer 114 may be part of DUT 102 and may use additional and/or different processing. For example, connection analyzer 114 may be configured to separate reference signal sequences from an FDMA uplink data signal using additional and/or different reference signal maps. It will also be appreciated that the above described modules are for illustrative purposes and that features or portions of features described herein may be performed by different and/or additional modules, components, or nodes. For example, aspects of detecting antenna port misconfiguration herein may be performed by connection analyzer 114 and/or other modules. In another example, connection analyzer 114 and report module 116 may be integrated or co-located or may be located on different nodes or computing platforms.

Figure 2:
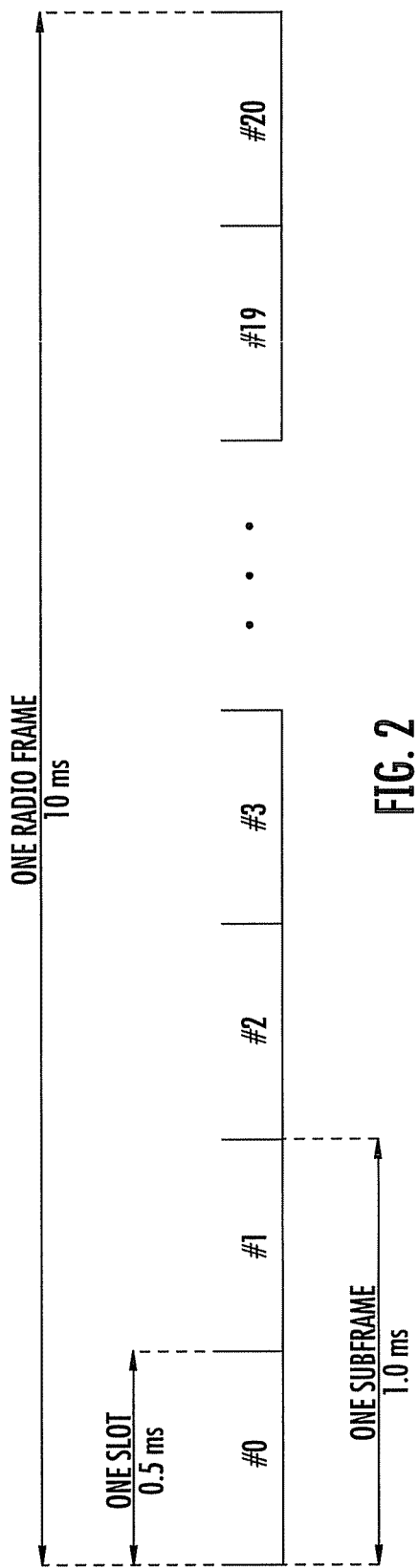
FIG. 2 is a diagram illustrating logical data portions of an LTE radio frame.

FIG. 2 is a diagram illustrating logical data portions of an LTE radio frame. As stated above, uplink and downlink data may be transmitted or sent in LTE radio frames, e.g., from DUT 102 via radio head 104. Each LTE radio frame may be 10 milliseconds (ms) long comprising 10 subframes of 1 ms each. Each subframe may include 2 slots and/or 14 OFDM symbols. A slot may be 0.5 ms long and may include various amounts of LTE data. LTE data may be stored as modulated symbols in sub-carriers within an OFDM symbol. Each modulated symbol in a sub-carrier may typically represent two, four, or six bits. Sub-carriers may be data streams that are spaced 15 kilohertz apart from each other. In some embodiments, a LTE downlink subframe may typically include multiple RBs (RBs) of 12 sub-carriers. The LTE downlink subframe may be partitioned into two equal downlink slots. Each downlink slot may include multiple blocks of 12 sub-carriers with 6 or 7 symbols per sub-carrier (e.g., depending on whether frame uses an extended cyclic prefix or a normal cyclic prefix).

Figure 3:
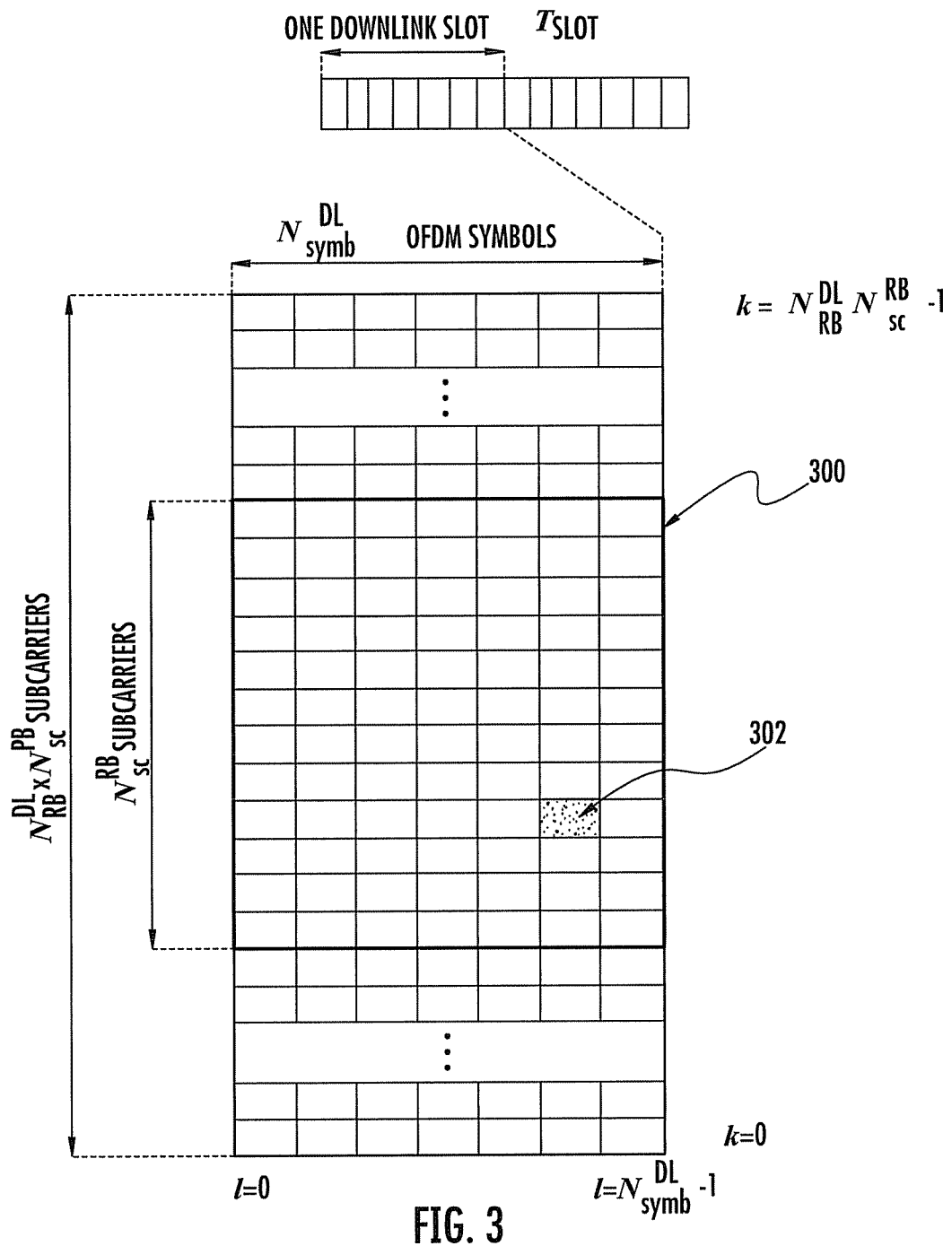
FIG. 3 is a diagram illustrating an exemplary resource element block portion.

FIG. 3 is a diagram illustrating an exemplary resource element block portion. A complete RB (RB) 300 may include 12 sub-carriers (e.g., data streams at different frequencies), each containing 14 symbols. For example, RB 300 may be logically thought of as a two-dimensional array of resource elements (REs). In FIG. 3, a portion (e.g., half) of an RB 300 is depicted.

Resource element 302 represents a logical portion of RB 300. For example, complete RB 300 may include about 168 resource elements, e.g., 14*12=168, depending on cyclic prefix size and/or other variables. Resource element 302 may be data logically located at or identifiable by a unique combination of a time domain value and a sub-carrier or frequency domain value. For example, resource element 302 may include a modulated symbol (e.g., six bits of data) at time x on sub-carrier y.

Resource element 302 may include control information or data (e.g., payload information). In some embodiments, resource element 302 may be associated with a particular LTE channel. For example, the LTE physical layer defines physical channels or signals for carrying particular data (e.g., transport or payload data) and control information. Exemplary channels may include a physical control format indicator channel (PCFICH), a physical downlink control channel (PD-CCH), a physical hybrid ARQ indicator channel (PHICH), or a physical downlink shared channel (PDSCH).

In some embodiments, resource element 302 may include a reference signal. As stated above, location of reference signals in an RB and values of reference signals may be determinable and may be indicative of an associated antenna port. For example, DUT 102 may insert a particular reference signal sequence at a particular location in RB 300. In this example, a particular reference signal may include a complex value and may be one of over 500 different values and may be based on various factors, including symbol position and/or cell (e.g., DUT 102) identity.

Figure 4:
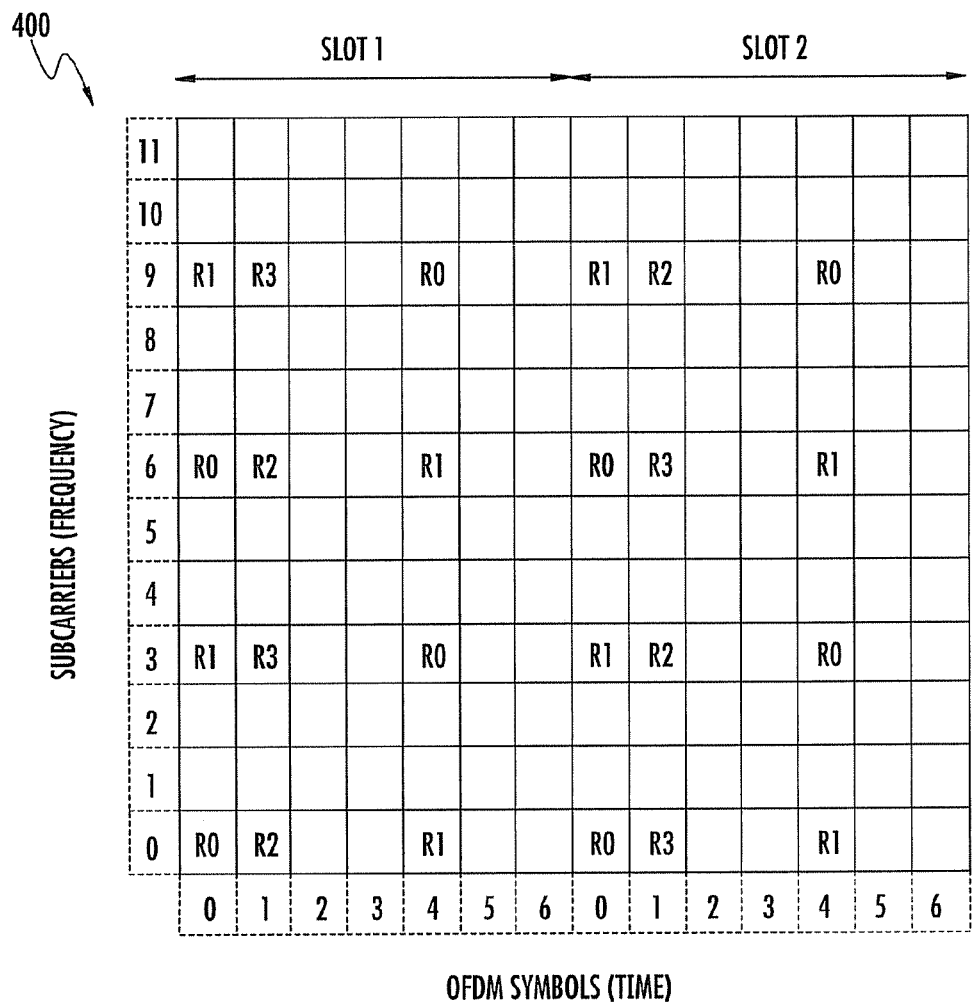
FIG. 4 is a diagram illustrating an exemplary reference signal map according to an embodiment of the subject matter described herein.

FIG. 4 is a diagram illustrating an exemplary reference signal map 400 according to an embodiment of the subject matter described herein. Reference signal map 400 may represent information stored and/or usable to identify locations of reference signals in RB 300. Reference signal map 400 may be represented as a time-frequency grid or two dimensional arrays similar to RB 300. For example, reference signal map 400 may include 12 OFDM signals (e.g., 2 slots) along the 'x' axis and twelve sub-carriers along the 'y' axis. Reference signal map 400 may be associated with a particular number of antenna ports, e.g., an antenna port configuration for transmitting data. For example, reference signal map 400 may indicate reference signal locations for various antenna ports.

Referring to FIG. 4, reference signal map 400 may indicate the locations of reference signals in RB 300 where the reference signals are associated with up to four antenna ports. For example, as depicted in reference signal map 400, reference signals associated with antenna port R0 and R1 are inserted within the first and third last OFDM symbol (e.g., column) of each slot with a frequency domain spacing (e.g., row spacing) of six sub-carriers.

In some embodiments, reference signals associated with different antenna ports may be located in different resource elements in RB 300. For example, each 'R0' in reference signal map 400 may represent a resource element in RB 300 where a reference signal sequence associated with an antenna port R0 is located, each 'R1' in reference signal map 400 may represent a resource element in RB 300 where a reference signal sequence associated with an antenna port R1 is located, and so on and so forth.

In some embodiments, connection analyzer 114 or another entity may use map 400 to identify reference signals in RB 300. For example, connection analyzer 114 may use reference signal map 400 to identify a reference signal sequence that appears to be associated with antenna port R0. In this example, the reference signal sequence may be located in a resource element of a downlink RB corresponding to the location of an 'R0' in map 400. After identify the reference signal and determining that a computed EVM associated with the reference signal is within a predetermine EVM threshold value, connection analyzer 114 may identify additional reference signals associated with other antenna ports using reference signal map 400.

In some embodiments, downlink data that is received or transmitted by wire interface (e.g., an RF cable) may have RB 300 that include only reference signal sequence that are associated with a particular antenna port.

In such embodiments, resource elements associated with other antenna ports may be empty or null in RB 300. Connection analyzer 114 may use this knowledge when determining whether an antenna port is misconfigured. For example, if connection analyzer 114 attempts to identify a reference signal in RB 300 but fails to identify a valid or appropriate reference signal sequence, connection analyzer 114 may assume a misconfiguration and continue looking for a valid reference signal at resource elements that are reserved for or associated with other antenna ports.

It will be appreciated that reference signal map 400 is illustrative and that additional and/or different maps may be stored and/or available to connection analyzer 114 or other modules and/or nodes. For example, connection analyzer 114 may use a reference signal map that indicate locations of references signals in an RB where the reference signals are associated with an eight antenna port configuration. In another example, a plurality of reference signal maps may be stored where each reference signal map is associated with a single antenna port or antenna port configuration.

Figure 5:
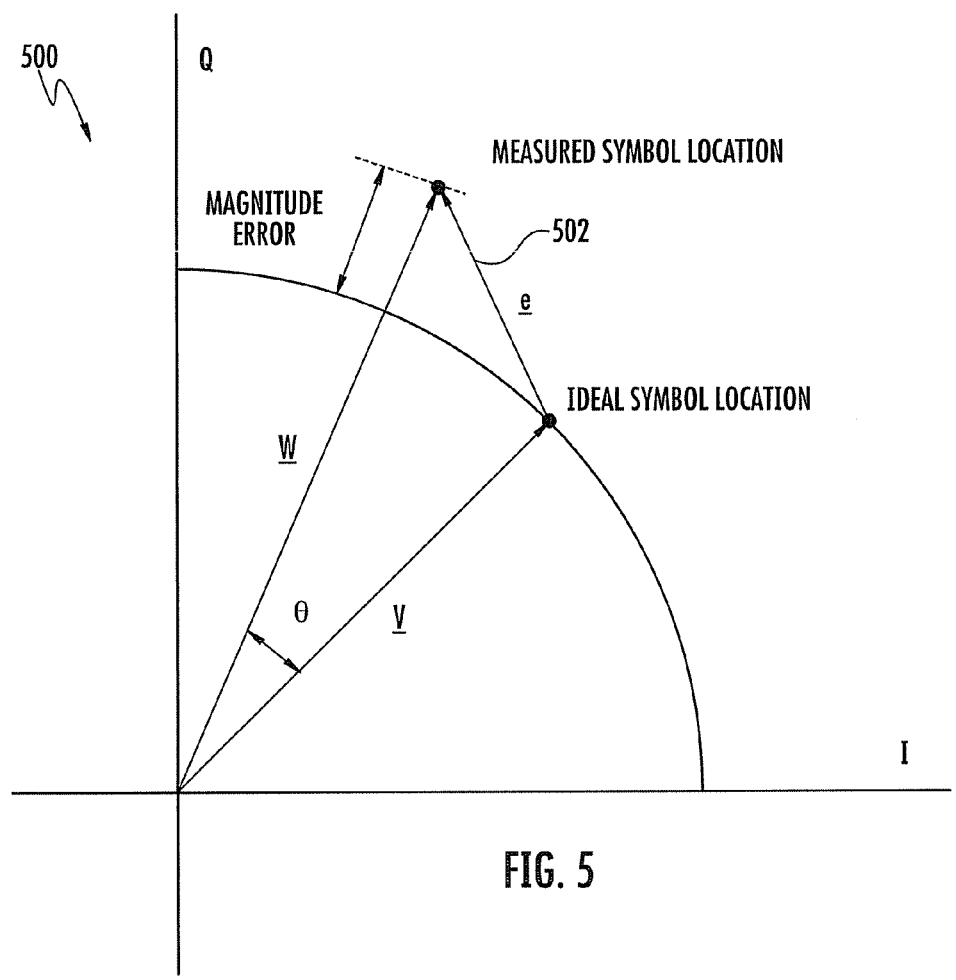
FIG. 5 is a diagram illustrating a portion of a constellation diagram including an error vector magnitude (EVM)

FIG. 5 is a diagram illustrating a portion of constellation diagram 500 including an EVM 402. Constellation diagram 500 may be a representation of a signal modulated by a digital modulation scheme. For example, LTE or LTE advanced data associated with antenna ports may be encoded and modulated using various techniques, such as quadrature phase-shift keying (QPSK), 4-QAM, or 64-QAM. QPSK may be an encoding scheme that allows a higher data transfer rate by encoding two bits per symbol in four different phases.

Constellation diagram 500 may display a signal as a two-dimensional scatter diagram (e.g., points on a complex plane). Constellation diagram 500 may include an 'I' axis (e.g., a horizontal axis) representing in-phase values and a 'Q' axis (e.g., a vertical axis) representing quadrature values. For example, each point on constellation diagram may represent a complex number having a real part (an 'I' value) and an imaginary part (a 'Q' value).

In FIG. 5, a top-left quadrant or phase of constellation diagram 500 is depicted. Constellation diagram 500 may depict an ideal symbol location of a reference signal associated with an antenna port. The ideal symbol location may be determined by various techniques, e.g., demodulating a transmitted signal using a phase-shift keying demodulation process to generate an I value and a Q value or by approximating an ideal symbol location using a known reference signal sequence associated with an antenna port.

Constellation diagram 500 may also depict a measured symbol location (e.g., as received). The measured symbol location may be based on an actual reference signal observed and may be determined by various techniques, e.g., demodulating a received signal using a phase-shift keying demodulation process to generate an I value and a Q value. The measured symbol location may differ from the ideal symbol location for various reasons, including carrier leakage, phase noise, and/or low image rejection ratio.

Constellation diagram 500 may also depict EVM 502. EVM 502 may generally be used for determining the performance or quality of a digital radio transmitter or receiver. In some embodiments, EMV 502 may indicate the difference between a measured symbol and an ideal symbol. For example, EVM 502 may be represented as a vector between an ideal symbol point and a measured symbol point.

In some embodiments, EVM 502 may be used as in indicator in detecting antenna port misconfiguration. For example, connection analyzer 114 may be aware of an expected reference signal sequence associated with an antenna port and may use this information in computing an associated EVM. Connection analyzer 114 may also be configured with an acceptable EVM threshold. If a computed EVM is within the predetermined EVM threshold, the connection and/or related antenna port may be determined to be valid or correctly configured. If a computed EVM is not within the predetermined EVM threshold, the connection and/or related antenna port may be determined to be invalid or misconfigured.

Figure 6:
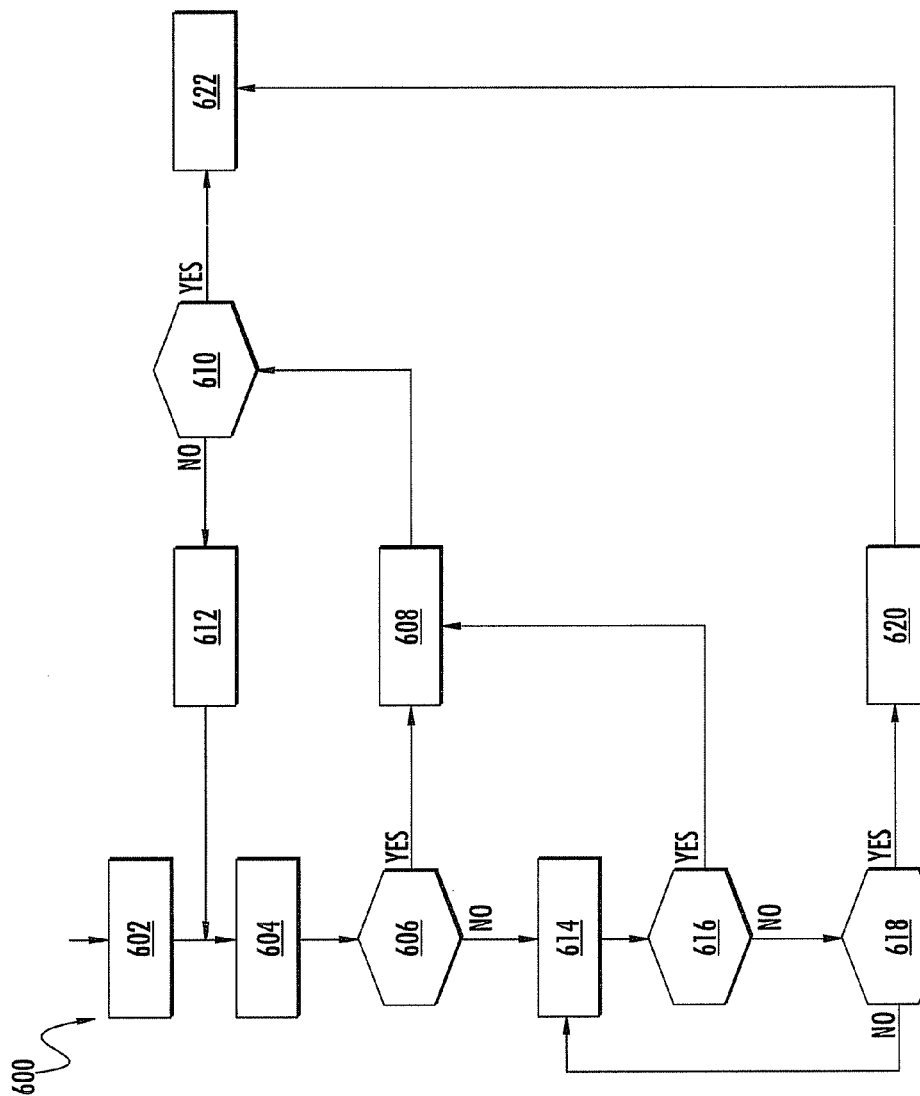
FIG. 6 is a diagram illustrating an exemplary process for analyzing antenna port configurations according to an embodiment of the subject matter described herein.

FIG. 6 is a diagram illustrating an exemplary process 600 for analyzing antenna port configurations according to an embodiment of the subject matter described herein. In some embodiments, exemplary process 600, or portions thereof, may be performed in testing platform 112, connection analyzer 114, report module 116, or another node and/or module.

Exemplary process 600 may include one or more of steps 602-622. At step 602, downlink data may be acquired for all active antenna ports. For example, in-phase and quadrature (IQ) values associated with reference signals of different antenna ports may be collected or derived and provided to connection analyzer 114.

At step 604, an EVM may be computed for a reference signal associated with an antenna port. For example, connection analyzer 114 may receive or derive IQ values associated with a reference signal and use this information in computing an EVM.

At step 606, the computed EVM may be compared to an EVM threshold, if the EVM is less than the threshold, process 600 may continue at step 608. If the EVM is greater than the threshold, process 600 may continue at step 614.

At step 608, in response to the computed EVM being within the EVM threshold, the connection and/or associated antenna port may be identified as valid or correctly configured. For example, connection analyzer 114 may identify the connection and/or associated antenna port in a stored list of valid antenna port configurations.

At step 610, it may be determined whether any active antenna ports need to be analyzed, if additional connections and/or associated antenna ports need to be analyzed, process 600 may continue at step 612. If no active antenna ports need to be analyzed, process 600 may continue at step 622.

At step 612, another connection and/or antenna port may be analyzed. For example, connection analyzer 114 may analyze another reference signal associated with a different valid antenna port by continuing at step 602.

At step 614, in response to the computed EVM being within the EVM threshold, the connection and/or associated antenna port may be identified as invalid or misconfigured. Moreover, a new EVM may be computed for another reference signal associated with or appearing to be associated with a different (e.g., unanalyzed) antenna port.

At step 616, the new EVM may be compared to the EVM threshold, if the new EVM is within the threshold process, 600 may continue at step 608. If the new EVM is greater than the threshold, process 600 may continue at step 618.

At step 618, in response to the new EVM being greater than the threshold, it may be determined that the current reference signal is also not associated with the connection or antenna port. As such, it may be determine whether reference signals associated with other (e.g., unanalyzed) antenna ports can be analyzed, if reference signals associated with other antenna ports can be analyzed, process 600 may continue at step 614, where a new EVM may be computed based on an antenna port yet to be analyzed. If no reference signals associated with other antenna ports can be analyzed, process 600 may continue at step 620.

At step 620, in response to analyzing reference signals associated with all antenna ports and failing to find an EVM that is within the threshold, the connection and/or associated antenna port may be identified as invalid or misconfigured. For example, connection analyzer 114 may identify the connection and/or associated antenna port in a stored list of invalid antenna port configurations.

At step 622, connection analysis information may be finalized, stored, and/or processed. For example, a list of valid and invalid antenna port configurations may be provided to report module 116.

It will be appreciated that the above described processing sequence is for illustrative purposes. In some embodiments, a processing sequence may include additional and/or different processing steps and/or steps may occur in a different temporal order.

Figure 7:
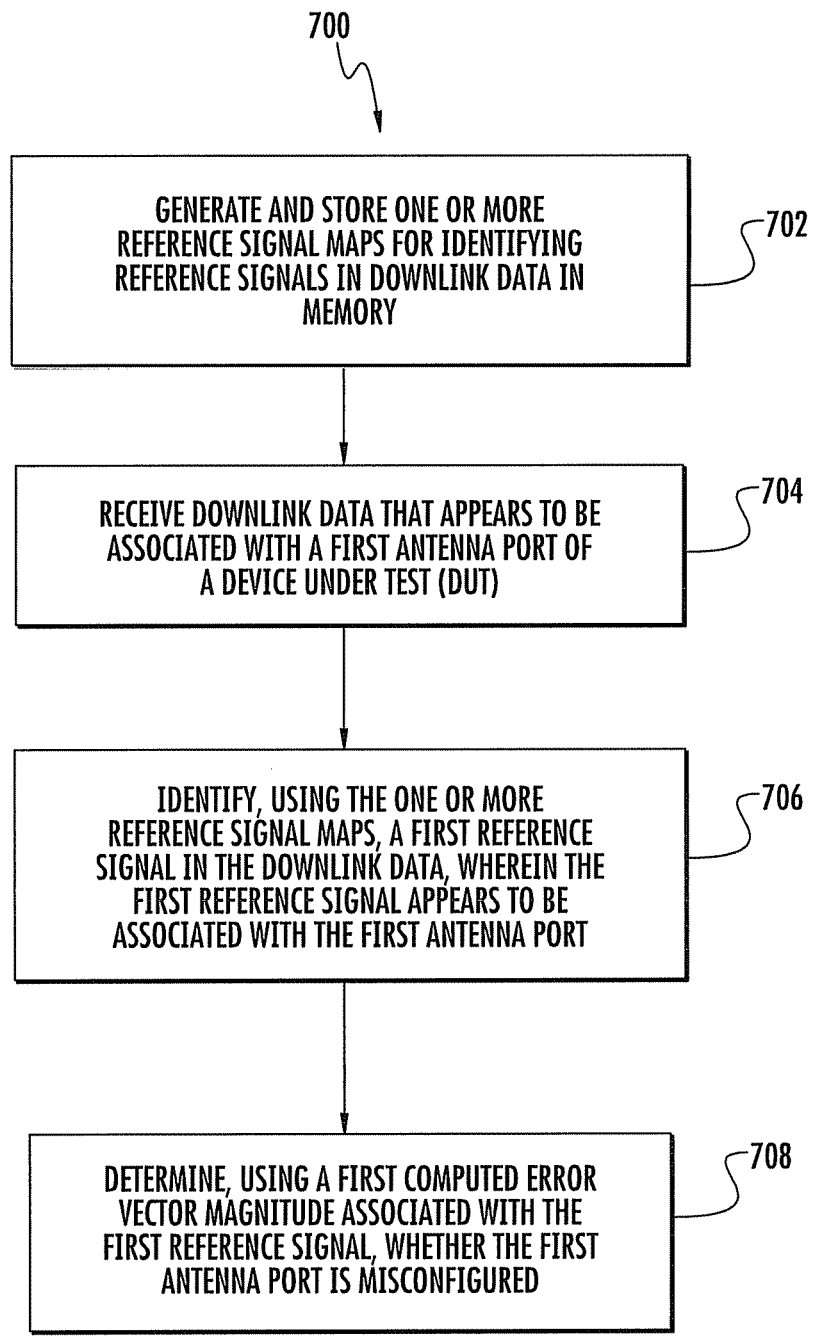
FIG. 7 is a diagram illustrating an exemplary process for detecting antenna port misconfigurations according to an embodiment of the subject matter described herein.

FIG. 7 is a diagram illustrating an exemplary process for detecting antenna port misconfigurations according to an embodiment of the subject matter described herein. In some embodiments, exemplary process 700, or portions thereof, may be performed by or at testing platform 112, connection analyzer 114, report module 116, a multi-UE simulator, radio head 104, radio head 108, a CPRI interfacing node, a patch panel node, a splitting or switching node, and/or another node or module.

At step 702, one or more reference signal maps for identifying reference signals in downlink data may be generated and/or stored. For example, map 400 may be generated and stored in memory and accessible by connection analyzer 114.

At step 704, downlink data may be received that appears to be associated with a first antenna port of DUT 102. In some embodiments, the downlink data may be provided by DUT 102, another node, or is retrieved from storage. In some embodiments, the downlink data may be provided from DUT 102 to testing platform 112 by one or more physical cables.

In some embodiments, DUT 102 comprises an evolved Node B, a Node B, a WiMAX base station, an evolved packet core (EPC) network, an EPC network node, or a base transceiver station (BTS).

At step 706, using the one or more reference signal maps, a first reference signal in the downlink data may be identified. The first reference signal may appear to be associated with the first antenna port.

At step 708, it may be determined, using a first computed EVM associated with the first reference signal, whether the first antenna port is misconfigured.

In some embodiments, determining that the first antenna port is misconfigured may include determining that the first computed EVM is above or below a predetermined threshold.

In some embodiments, in response to determining that the first antenna port is misconfigured, it may be determined whether a second reference signal that appears to be associated with a second antenna port of DUT 102 is associated with the first antenna port.

In some embodiments, determining whether the second reference signal is associated with the first antenna port may include identifying, using the one or more reference signal maps, the second reference signal in the downlink data and determining, using a second computed EVM associated with the second reference signal, that the second reference signal is associated with the first antenna port.

In some embodiments, determining that the second reference signal is associated with the first antenna port may include determining that the second computed EVM is within a predetermined threshold.

In some embodiments, antenna port configuration analysis information may be provided via a user interface. For example, antenna port configuration analysis information may include information for indicating that a misconfiguration may be corrected by swapping the cable connected to the first antenna port and the cable connected to the second antenna port, information for indicating that the first antenna port is misconfigured or has a bad connection, or information for indicating that the first antenna port is properly configured.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for detecting antenna port misconfigurations, the method comprising:
   generating and storing one or more reference signal maps for identifying reference signals in downlink data in memory;
   receiving downlink data that appears to be associated with a first antenna port of a device under test (DUT);
   identifying, using the one or more reference signal maps, a first reference signal in the downlink data, wherein the first reference signal appears to be associated with the first antenna port; and
   determining, using a first computed error vector magnitude associated with the first reference signal, whether the first antenna port is misconfigured.

2. The method of claim 1 comprising:
   providing, via a user interface, antenna port configuration analysis information.

3. The method of claim 2 wherein the antenna port configuration analysis information includes information for indicating that a misconfiguration may be corrected by swapping the cable connected to the first antenna port and the cable connected to the second antenna port, information for indicating that the first antenna port is misconfigured or has a bad connection, or information for indicating that the first antenna port is properly configured.

4. The method of claim 1 comprising:
   in response to determining that the first antenna port is misconfigured, determining whether a second reference signal that appears to be associated with a second antenna port of the DUT is associated with the first antenna port.

5. The method of claim 4 wherein determining whether the second reference signal is associated with the first antenna port includes:
   identifying, using the one or more reference signal maps, the second reference signal in the downlink data; and
   determining, using a second computed error vector magnitude associated with the second reference signal, that the second reference signal is associated with the first antenna port.

6. The method of claim 5 wherein determining that the second reference signal is associated with the first antenna port includes determining that the second computed error vector magnitude is within a predetermined threshold.

7. The method of claim 1 wherein determining that the first antenna port is misconfigured includes determining that the first computed error vector magnitude is above or below a predetermined threshold.

8. The method of claim 1 wherein the DUT comprises an evolved Node B, a Node B, a WiMAX base station, an evolved packet core (EPC) network, an EPC network node, or a base transceiver station (BTS).

9. The method of claim 1 wherein the downlink data is provided by the DUT, another node, or is retrieved from storage.

10. The method of claim 1 wherein the downlink data is provided from the DUT to a testing platform by physical cables.

11. A system for detecting antenna port misconfigurations, the system comprising:
    a memory configured to store one or more reference signal maps for identifying reference signals in downlink data in memory; and
    a connection analyzer configured to receive downlink data that appears to be associated with a first antenna port of a device under test (DUT), to identify, using the one or more reference signal maps, a first reference signal in the downlink data, wherein the first reference signal appears to be associated with the first antenna port, and to determine, using a first computed error vector magnitude associated with the first reference signal, whether the first antenna port is misconfigured, and in response to determining that the first antenna port is misconfigured, to determine whether a second reference signal that appears to be associated with a second antenna port of the DUT is associated with the first antenna port.

12. The system of claim 11 comprising:
    a report module configured to provide, via a user interface, antenna port configuration analysis information.

13. The system of claim 12 wherein the antenna port configuration analysis information includes information for indicating that a misconfiguration may be corrected by swapping the cable connected to the first antenna port and the cable connected to the second antenna port, information for indicating that the first antenna port is misconfigured or has a bad connection, or information for indicating that the first antenna port is properly configured.

14. The system of claim 11 wherein the connection analyzer is configured to determine, in response to determining that the first antenna port is misconfigured, whether a second reference signal that appears to be associated with a second antenna port of the DUT is associated with the first antenna port.

15. The system of claim 14 wherein the connection analyzer is configured to determine whether the second reference signal is associated with the first antenna port by identifying, using the one or more reference signal maps, the second reference signal in the downlink data, and determining, using a second computed error vector magnitude associated with the second reference signal, that the second reference signal is associated with the first antenna port.

16. The system of claim 15 wherein determining the second reference signal is associated with the first antenna port includes determining that the second computed error vector magnitude is within a predetermined threshold.

17. The system of claim 11 wherein determining that the first antenna port is misconfigured includes determining that the first computed error vector magnitude is above or below a predetermined threshold.

18. The system of claim 11 wherein the DUT comprises an evolved Node B, a Node B, a WiMAX base station, an evolved packet core (EPC) network, an EPC network node, or a base transceiver station (BTS).

19. The system of claim 11 wherein the downlink data is provided by the DUT, another node, or is retrieved from storage.

20. The system of claim 11 wherein the downlink data is provided from the DUT to a testing platform by physical cables.

21. The system of claim 11 wherein the system comprises a testing platform, a multiple UE simulator node, a radio head unit, a CPRI interfacing node, a patch panel node, a splitting or switching node, or a network node.

22. A non-transitory computer readable medium comprising computer executable instructions embodied in a computer readable medium that when executed by a processor of a computer control the computer to perform steps comprising:
 storing one or more reference signal maps for identifying reference signals in downlink data in memory;
 receiving downlink data that appears to be associated with a first antenna port of a device under test (DUT);
 identifying, using the one or more reference signal maps, a first reference signal in the downlink data, wherein the first reference signal appears to be associated with the first antenna port;
 determining, using a first computed error vector magnitude associated with the first reference signal, whether the first antenna port is misconfigured; and
 in response to determining that the first antenna port is misconfigured, determining whether a second reference signal that appears to be associated with a second antenna port of the DUT is associated with the first antenna port.

* * * * *